(12) United States Patent
Tebbe et al.

(10) Patent No.: US 11,358,430 B2
(45) Date of Patent: Jun. 14, 2022

(54) SUSPENSION SYSTEM WITH VARIABLE ROLL RESISTANCE

(71) Applicant: DEERE & COMPANY, Moline, IL (US)

(72) Inventors: Scott A. Tebbe, Cedar Falls, IA (US); Thomas Butts, Jesup, IA (US); David Rix, Lehi, UT (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 16/902,750

(22) Filed: Jun. 16, 2020

(65) Prior Publication Data

US 2021/0387495 A1 Dec. 16, 2021

(51) Int. Cl.
| | | |
|---|---|---|
| B60G 17/015 | (2006.01) | |
| B60G 17/016 | (2006.01) | |
| B60G 17/08 | (2006.01) | |
| B62D 49/06 | (2006.01) | |

(52) U.S. Cl.
CPC ....... *B60G 17/0152* (2013.01); *B60G 17/016* (2013.01); *B60G 17/08* (2013.01); *B62D 49/06* (2013.01)

(58) Field of Classification Search
CPC .. B60G 17/0152; B60G 17/08; B60G 17/016; B60G 17/056
See application file for complete search history.

(56) References Cited

U.S. PATENT DOCUMENTS

| | | | | |
|---|---|---|---|---|
| 3,643,970 A | * | 2/1972 | Gauchet | B60G 17/056 |
| | | | | 280/6.154 |
| 5,193,845 A | * | 3/1993 | Yokote | B60G 17/0152 |
| | | | | 280/5.503 |
| 5,205,581 A | * | 4/1993 | Kallenbach | B60G 17/04 |
| | | | | 280/124.161 |
| 6,308,973 B1 | * | 10/2001 | Griebel | B60G 9/02 |
| | | | | 280/124.158 |
| 6,578,855 B2 | | 6/2003 | Wallestad | |
| 6,722,994 B2 | | 4/2004 | Woods et al. | |
| 7,192,034 B2 | | 3/2007 | Radke et al. | |
| 7,240,906 B2 | * | 7/2007 | Klees | B60G 17/0152 |
| | | | | 280/5.502 |
| 7,451,840 B2 | | 11/2008 | Radke et al. | |

(Continued)

FOREIGN PATENT DOCUMENTS

| | | |
|---|---|---|
| DE | 2023283 A | 11/1970 |
| GB | 2564763 A | 1/2019 |

OTHER PUBLICATIONS

Hydro-Pneumatic Cabin Suspension, YouTube video screen print, retrieved from <URL: https://www.youtube.com/watch?v=041yMp1BQ8s>, accessed Jun. 12, 2020, p. 1.

(Continued)

*Primary Examiner* — Frank B Vanaman

(57) ABSTRACT

A suspension system for a work vehicle includes a first cylinder having a piston side, a second cylinder having a piston side, and a first valve connected to the first and second cylinders, which extend and retract during a roll condition of the suspension system. The first valve selectively enables and restricts fluid flow between the piston side of the first cylinder and the piston side of the second cylinder to adjust a roll resistance of the suspension system.

19 Claims, 5 Drawing Sheets

(56) References Cited

U.S. PATENT DOCUMENTS

| | | | |
|---|---|---|---|
| 7,503,411 | B2 | 3/2009 | Radke et al. |
| 7,581,598 | B2 | 9/2009 | Radke et al. |
| 7,584,812 | B2 | 9/2009 | Radke et al. |
| 7,617,881 | B2 | 11/2009 | Radke et al. |
| 7,641,007 | B2 | 1/2010 | Radke et al. |
| 8,065,054 | B2 | 11/2011 | Tarasinski et al. |
| 8,434,581 | B2 | 5/2013 | Buhl et al. |
| 9,238,489 | B2 | 1/2016 | Schauer et al. |
| 9,428,025 | B2 | 8/2016 | Foxen et al. |
| 9,657,749 | B2 | 5/2017 | Bissbort et al. |
| 10,556,478 | B2 | 2/2020 | Ballaire |
| 11,059,339 | B2 | 7/2021 | Zwanzger et al. |
| 2002/0157451 | A1* | 10/2002 | Brandenburger .. B60G 17/0408 73/11.04 |
| 2007/0216127 | A1* | 9/2007 | Walentowski ......... B60G 11/27 280/124.157 |
| 2010/0044976 | A1* | 2/2010 | Rades ................ B60G 17/0162 280/5.507 |
| 2012/0098227 | A1 | 4/2012 | Holst et al. |
| 2018/0112686 | A1 | 4/2018 | Roberti |
| 2018/0319234 | A1 | 11/2018 | Klittich et al. |
| 2019/0316692 | A1 | 10/2019 | Schmidt et al. |
| 2020/0095736 | A1 | 3/2020 | Wiktor |

OTHER PUBLICATIONS

Wolfgang Bauer, Hydropneumatic Suspension Systems, book, 2011, pp. 162-165, 168-171, and 182-185.
AGCO GmbH, FENDT 1000 Vario, brochure, pp. 1-19.
German Search Report issued in application No. DE102021204876. 5, dated Feb. 10, 2022, 7 pages.
German Search Report issued in related application No. DE102021204876.5, dated Feb. 10, 2022, 14 pages.

* cited by examiner

SUSPENSION SYSTEM WITH VARIABLE ROLL RESISTANCE

CROSS-REFERENCE TO RELATED APPLICATIONS

N/A

FIELD OF THE DISCLOSURE

The present disclosure relates to suspension system for providing variable resistance to rotation about the roll axis of a work vehicle.

BACKGROUND

Suspension systems are used in work vehicles to provide relative movement between two or more components. Suspension systems can provide relative movement or motion between components in multiple directions and around multiple axes. Suspension systems can also provide boundaries or limits to the amount of relative movement. Suspension systems can provide relative movement between an axle and a frame or chassis of a work vehicle.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a suspension system with a variable roll resistance for an axle of a work vehicle.

According to an aspect of the present disclosure, a suspension system for a work vehicle includes a first cylinder having a piston side, a second cylinder having a piston side, the first and second cylinders extending and retracting during a roll condition of the suspension system, and a first valve selectively enabling and restricting fluid flow between the piston side of the first cylinder and the piston side of the second cylinder to adjust a roll resistance of the suspension system.

The suspension system can further include a first accumulator fluidly connected to the piston side of the first cylinder, and a second valve selectively enabling and restricting fluid flow between the first accumulator and the piston side of the first cylinder to adjust the roll resistance of the suspension system.

The suspension system can further include a second accumulator fluidly connected to the piston side of the second cylinder, and a third valve selectively enabling and restricting fluid flow between the second accumulator and the piston side of the second cylinder to adjust the roll resistance of the suspension system.

The suspension system can further include a third accumulator fluidly connected to the piston side of the first cylinder, the third accumulator bypassing the second valve, and a fourth accumulator fluidly connected to the piston side of the second cylinder, the fourth accumulator bypassing the third valve. The suspension system can further include a fifth accumulator fluidly connected to a rod side of the first cylinder and a rod side of the second cylinder.

The first valve can include an open position enabling fluid flow between the piston side of the first cylinder and the piston side of the second cylinder, an intermediate position restricting fluid flow between the piston side of the first cylinder and the piston side of the second cylinder, and a closed position preventing fluid flow between the piston side of the first cylinder and the piston side of the second cylinder.

The second valve can include an open position enabling fluid flow between the first accumulator and the piston side of the first cylinder, an intermediate position restricting fluid flow between the first accumulator and the piston side of the first cylinder, and a closed position preventing fluid flow between the first accumulator and the piston side of the first cylinder.

The third valve can include an open position enabling fluid flow between the second accumulator and the piston side of the second cylinder, an intermediate position restricting fluid flow between the second accumulator and the piston side of the second cylinder, and a closed position preventing fluid flow between the second accumulator and the piston side of the second cylinder.

The roll resistance of the suspension system can be increased by at least partially closing the first valve. The roll resistance of the suspension system can be increased by at least partially closing one of the first valve, the second valve, and the third valve. The roll resistance of the suspension system can be decreased by at least partially opening the first valve. The roll resistance of the suspension system can be decreased by at least partially opening one of the first valve, the second valve, and the third valve.

According to an aspect of the present disclosure, a work vehicle having a variable suspension system includes a plurality of ground engaging apparatus, an operator station, and a left-side cylinder having a piston side and a right-side cylinder having a piston side, the left-side and right-side cylinders positioned between the operator station and the ground engaging apparatus, and the left-side and right-side cylinders extending and retracting during a roll condition of the suspension system, and a first valve selectively enabling and restricting fluid flow between the piston side of the left-side cylinder and the piston side of the right-side cylinder to adjust a roll resistance of the suspension system, the first valve including an open position enabling fluid flow between the piston side of the left-side cylinder and the piston side of the right-side cylinder, an intermediate position restricting fluid flow between the piston side of the left-side cylinder and the piston side of the right-side cylinder, and a closed position preventing fluid flow between the piston side of the left-side cylinder and the piston side of the right-side cylinder.

The work vehicle can further include a first accumulator fluidly connected to the piston side of the left-side cylinder, and a second valve selectively enabling and restricting fluid flow between the first accumulator and the piston side of the left-side cylinder to adjust the roll resistance of the suspension system, the second valve including an open position enabling fluid flow between the first accumulator and the piston side of the left-side cylinder, an intermediate position restricting fluid flow between the first accumulator and the piston side of the left-side cylinder, and a closed position preventing fluid flow between the first accumulator and the piston side of the left-side cylinder.

The work vehicle can further include a second accumulator fluidly connected to the piston side of the right-side cylinder, and a third valve selectively enabling and restricting fluid flow between the second accumulator and the piston side of the right-side cylinder to adjust a roll resistance of the suspension system, the third valve including an open position enabling fluid flow between the second accumulator and the piston side of the right-side cylinder, an intermediate position restricting fluid flow between the second accumulator and the piston side of the right-side cylinder, and a closed position preventing fluid flow between the second accumulator and the piston side of the right-side cylinder.

The work vehicle can further include a third accumulator fluidly connected to the piston side of the first cylinder, the third accumulator bypassing the second valve, and a fourth accumulator fluidly connected to the piston side of the second cylinder, the fourth accumulator bypassing the third valve. The work vehicle can further include a fifth accumulator fluidly connected to a rod side of the first cylinder and a rod side of the second cylinder.

The roll resistance of the suspension system can be increased by at least partially closing the first valve, and the roll resistance of the suspension system can be further increased by at least partially closing at least one of the second valve and the third valve. The roll resistance of the suspension system can be decrease by at least partially opening the first valve, and the roll resistance of the suspension system can be further decreased by at least partially opening at least one of the second valve and the third valve.

According to an aspect of the present disclosure, a method of varying the roll resistance of a suspension system for a work vehicle includes determining a roll condition of the suspension system, determining whether to adjust a roll resistance of the suspension system based upon the roll condition of the suspension system, increasing the roll resistance of the suspension system when the roll condition is within a first set of values by at least partially closing a first valve, the first valve controlling fluid flow between a first cylinder and a second cylinder, and decreasing the roll resistance of the suspension system when the roll condition is within a second set of values by at least partially opening the first valve.

The method can further include increasing the roll resistance of the suspension system when the roll condition is within the first set of values by at least partially closing a second valve, the second valve controlling the flow between the first cylinder and an accumulator, and decreasing the roll resistance of the suspension system when the roll condition is within a second set of values by at least partially opening the second valve.

The method can further include increasing the roll resistance of the suspension system when the roll condition is within a first set of values by at least partially closing a third valve, the third valve controlling the flow between the second cylinder and an accumulator, and decreasing the roll resistance of the suspension system when the roll condition is within the second set of values by opening the third valve.

The method can further include increasing the roll resistance of the suspension system when the roll condition is within the first set of values by closing the first valve, the second valve, and the third valve, and decreasing the roll resistance of the suspension system when the roll condition is within the second set of values by opening the first valve, the second valve, and the third valve.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The implementations disclosed in the above drawings and the following detailed description are not intended to be exhaustive or to limit the disclosure to these implementations. Rather, there are several variations and modifications which may be made without departing from the scope of the present disclosure.

Figure 1:
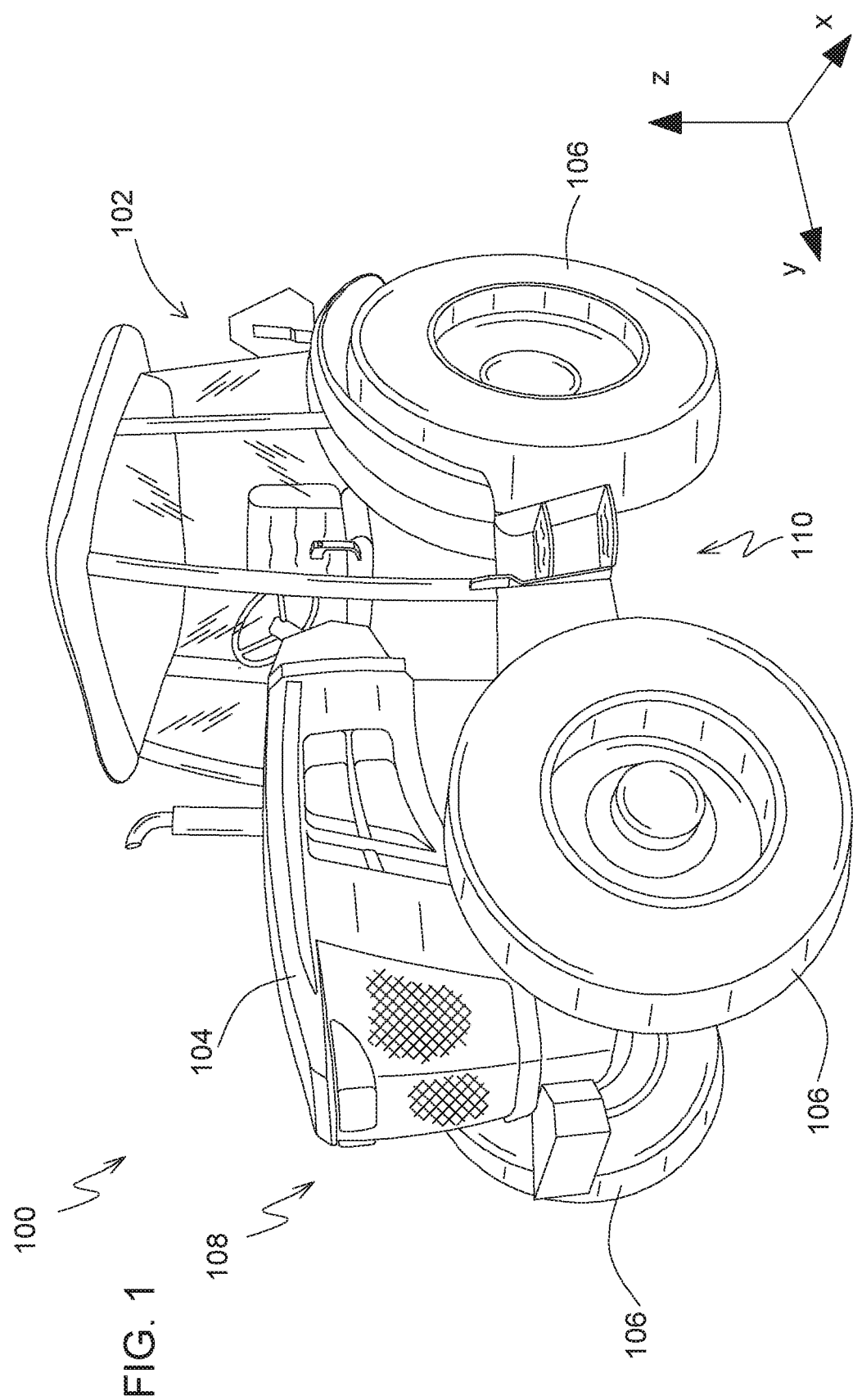
FIG. 1 is a perspective view of a work vehicle, according to an implementation.

FIG. 1 illustrates an agricultural work vehicle 100, for example an agricultural tractor. This disclosure also applies to other types of work vehicles in agriculture, construction, forestry, and road building. The agricultural work vehicle 100, hereinafter referred to as a tractor 100, can include a frame or chassis 110, an operator station or cab 102, and one or more ground engaging apparatus 106, for example wheels or track assemblies. The tractor 100 can have a rigid frame 110 or an articulated frame 110. The tractor 100 can include a power source 108 positioned under a covering or hood 104 and a transmission transferring power to the ground engaging apparatus 106, hereinafter referred to as wheels 106, and one or more power take off shafts. The tractor 100 can include an operator interface having any number and combination of electronic devices, such as an interactive display. The tractor 100 can move about different axes. The tractor 100 can pitch or rotate about an x-axis, which extends along the width of the tractor 100. The tractor 100 can roll or rotate about the y-axis, which extends along the length of the tractor 100. The work vehicle can yaw or rotate about the z-axis, which extends along the height of the tractor 100.

Figure 2:
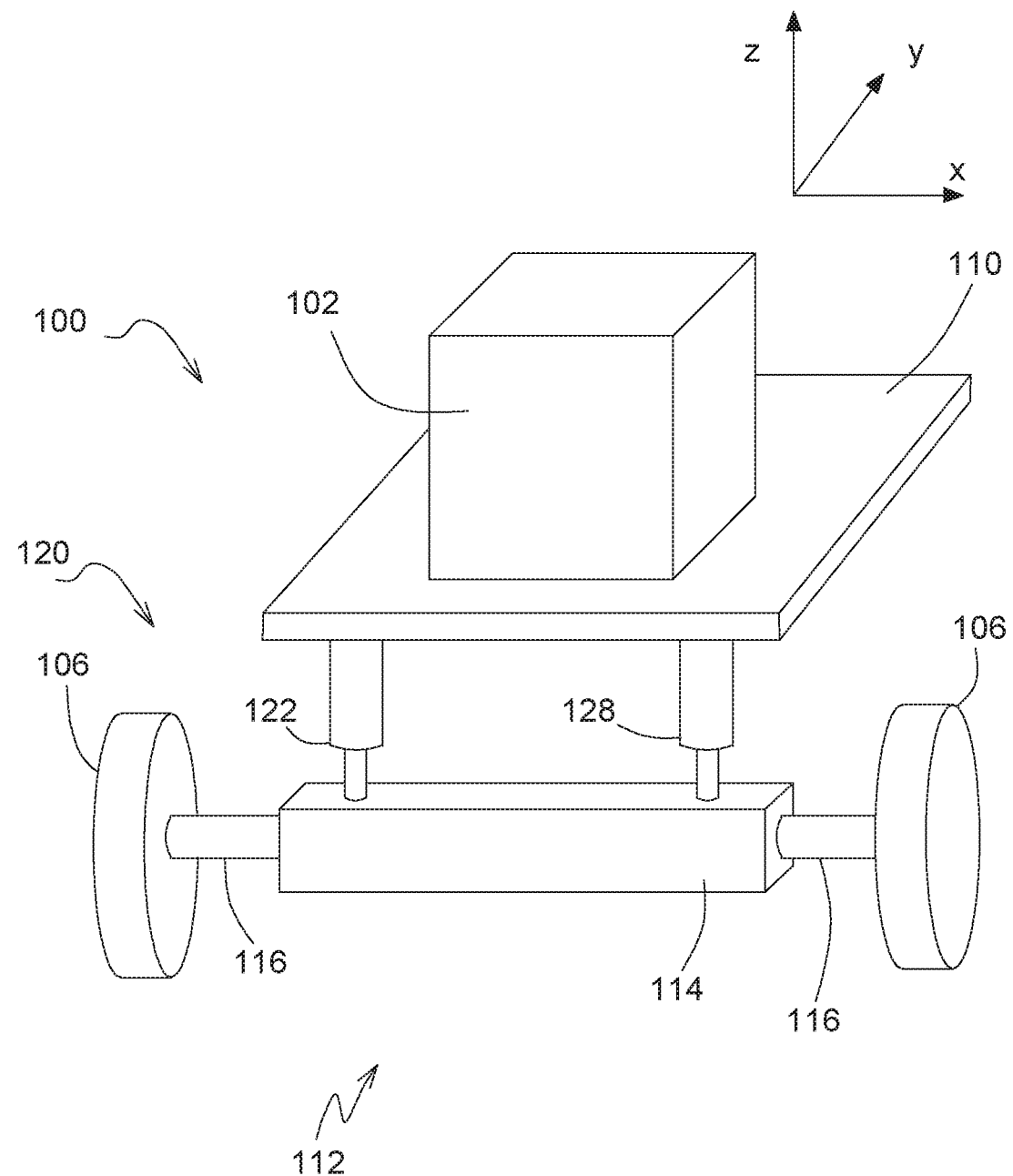
FIG. 2 is a perspective view of a suspension system for a work vehicle, according to an implementation.

With reference to FIG. 2, the tractor 100 can include an axle assembly 112 having an axle housing 114 and one or more axles 116 connected to one or more wheels 106. The tractor 100 can include a suspension system 120 positioned between the wheels 106 and the cab 102. The suspension system 120 can be positioned between the axle assembly 112 and the cab 102, the axle assembly 112 and the frame 110, the frame 110 and the cab 102, or any variations thereof. The suspension system 120 can include a first cylinder 122 and a second cylinder 128 positioned anywhere between the axle assembly 112 and the cab 102. The first cylinder 122, or left-side cylinder, can be positioned on the left side of the tractor 100 and the second cylinder 128, or right-side cylinder, can be positioned on the right side of the tractor 100. The first and second cylinders 122, 128 can be positioned with the piston side up and the rod side down, or vice versa. The first and second cylinders 122, 128 extend and retract as the suspension system 120 rolls left and right. When the suspension system 120 rolls left, the first cylinder 122 can retract and the second cylinder 128 can extend. When the suspension system 120 rolls right, the first cylinder 122 can extend and the second cylinder 128 can retract. The first and second cylinders 122, 128 can be single or double-acting pneumatic or hydraulic cylinders. The cab 102 can move about different axes. The movement of the cab 102 can be measured relative to the ground surface or terrain, or the movement of the cab 102 can be measured relative to the either the frame 110 or the axle assembly 112. The cab 102 can pitch or rotate about an x-axis, which extends along the width of the cab 102. The cab 102 can roll or rotate about the y-axis, which extends along the length of the cab 102. The cab 102 can yaw or rotate about the z-axis, which extends along the height of the cab 102. The suspension system 120 can limit the roll or rotation about the y-axis within specified or prescribed limits.

Figure 3:
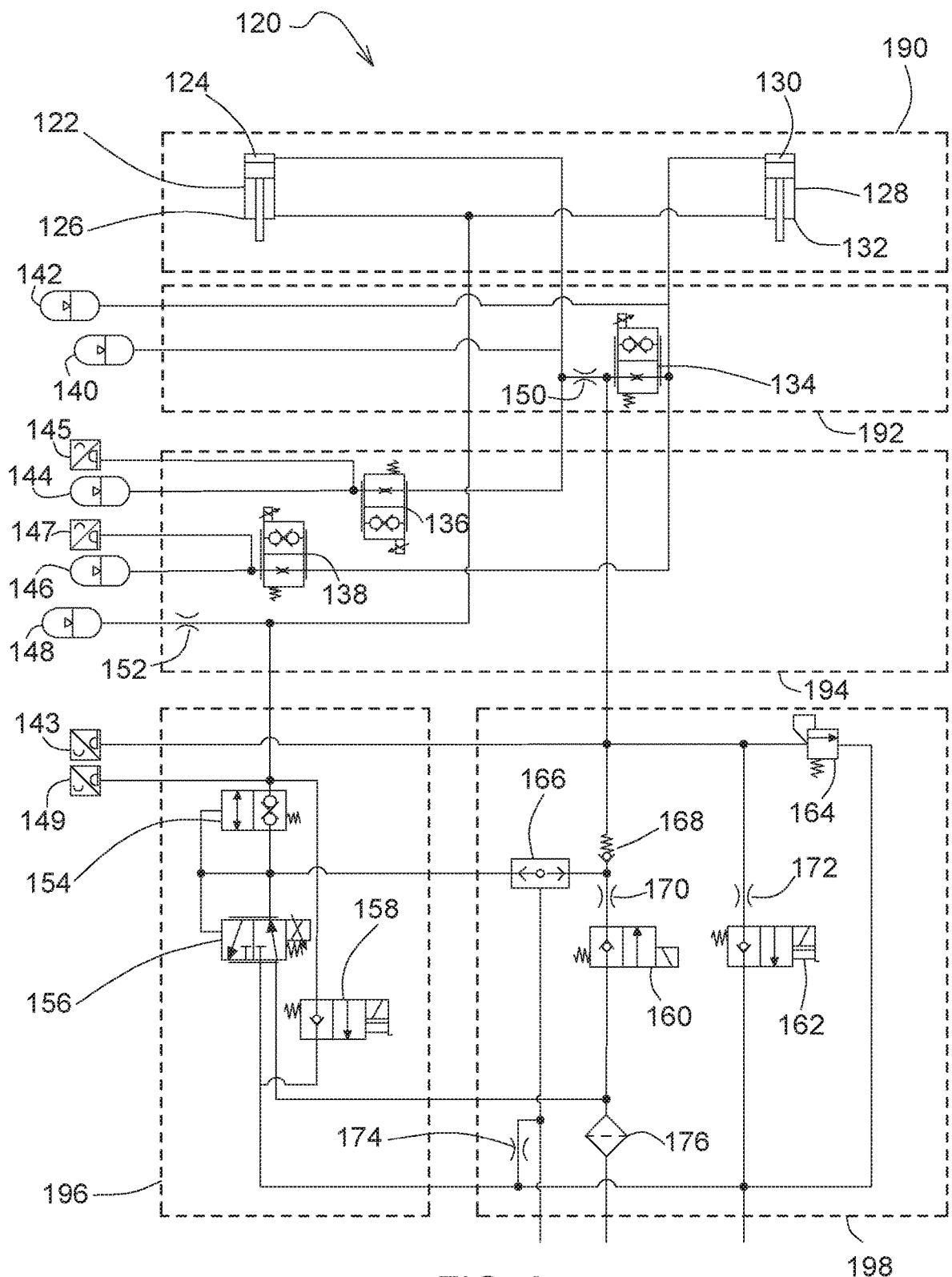
FIG. 3 is a schematic diagram of a suspension system for a work vehicle, according to an implementation.
Figure 4:
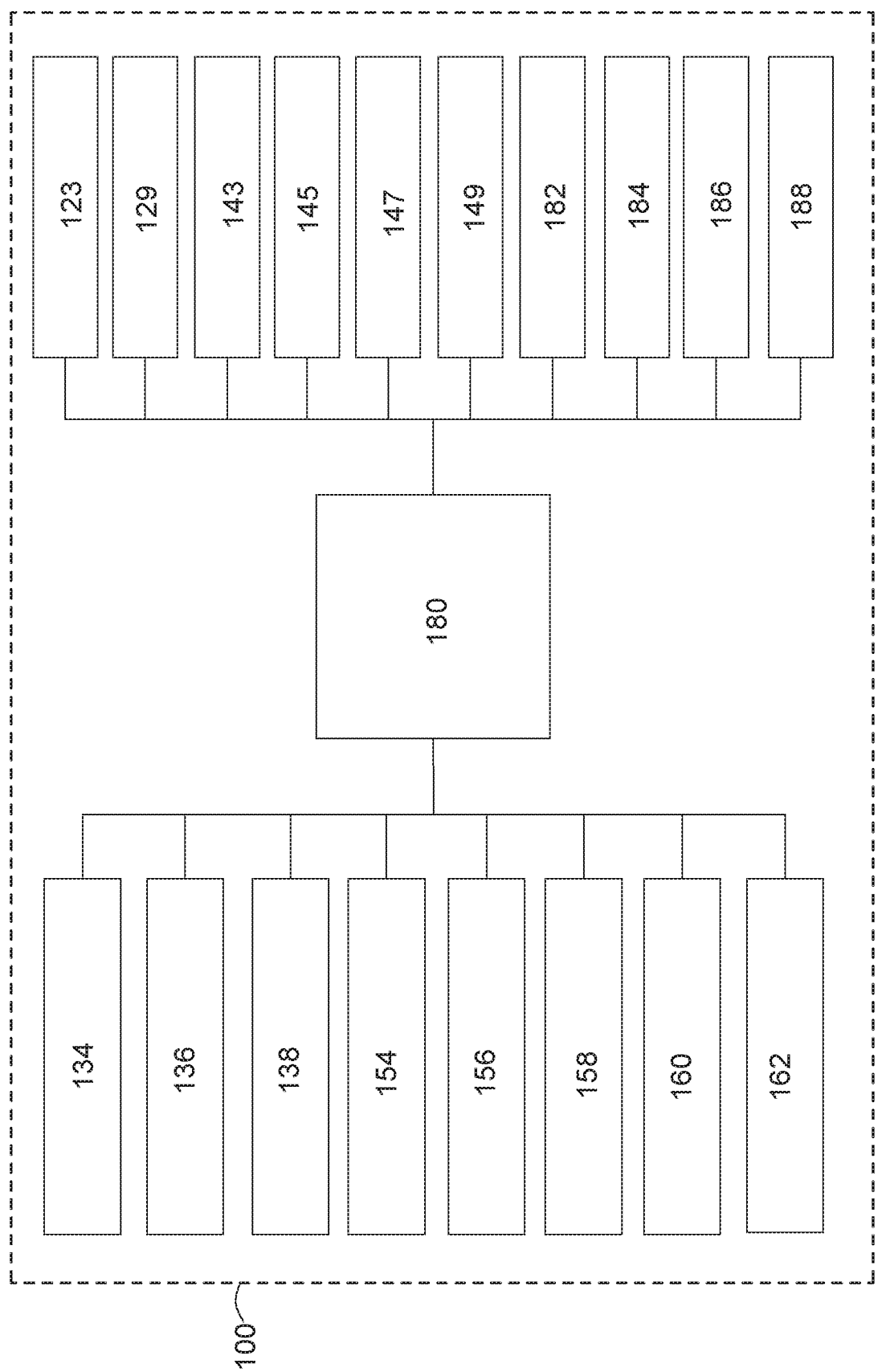
FIG. 4 is a schematic diagram of an electronic control system of a suspension system, according to an implementation.

With reference to FIG. 3, the suspension system 120 can include a cylinder circuit 190 with single or double acting pneumatic or hydraulic cylinders 122, 128. The suspension system 120 could include multiple cylinder circuits. The suspension system 120 can include a roll stabilization circuit 192 with accumulators 140, 142, a valve 134, and a flow control valve or flow restrictor 150. The suspension system 120 could include multiple roll stabilization circuits. The suspension system 120 can include a damping circuit 194 with accumulators 144, 146, 148, valves 136, 138, and a flow control valve or flow restrictor 152. The suspension system 120 could include multiple damping circuits. When the cylinders 122, 128 are double acting, the suspension system 120 can include a pressure circuit 196 fluidly connected to the to the rod side 126 of the first cylinder 122 and the rod side 132 of the second cylinder 128. The pressure circuit 196 can include valves 154, 156, 158. The suspension system 120 could include multiple pressure circuits. The suspension system 120 can include a level circuit 198 fluidly connected to the piston side 124 of the first cylinder 122 and the piston side 130 of the second cylinder 128. The level circuit 198 can include valves 160, 162, relief valve 164, shuttle valve 166, check valve 168, flow control valves or flow restrictors 170, 172, 174, and filter 176. The suspension system 120 could include multiple level circuits. The suspension system 120 can include one or more pneumatic or hydraulic pumps (not shown) to provide pressurized fluid to the system. The one or more pumps can be connected to the suspension system 120 via the level circuit 198.

The suspension system 120 can include an accumulator 140 fluidly connected to the piston side 124 of the first cylinder 122, an accumulator 142 fluidly connected to the piston side 130 of the second cylinder 128, or both. The accumulator 140 can bypass the valve 136 and the accumulator 142 can bypass the valve 138. Alternatively, the suspension system 120 can include an accumulator 140 fluidly connected to the piston side 124 of the first cylinder 122 and the piston side 130 of the second cylinder 128. In this alternative implementation, the accumulator 140 can bypass the first valve 134. Any of the accumulators discussed herein can be gas charged. The suspension system 120 can include a first valve 134, which can fluidly connect the piston side 124 of the first cylinder 122 to the piston side 130 of the second cylinder 128. The first valve 134 can also fluidly connect the accumulator 140 to the piston side 130 of the second cylinder 128 and the accumulator 142 to the piston side 124 of the first hydraulic cylinder 122. The first valve 134 can control fluid flow between the piston side 124 of the first cylinder 122 and the piston side 130 of the second cylinder 128 as the first and second cylinders 122, 128 extend and retract. The first valve 134 can selectively enable or prevent fluid flow between the piston side 124 of the first cylinder 122 and the piston side 130 of the second cylinder 128. The first valve 134 can be an adjustable or variable two-position valve with an open or flow control position and a closed position. The first valve 134 can have an open position, an intermediate position, and a closed position. The intermediate position can include a plurality of partially open and partially closed positions between the open and the closed positions. When the first valve 134 is in the open position, fluid can flow from the retracting cylinder to the extending cylinder. When the first valve 134 is in the intermediate position, fluid can flow from the retracting cylinder to the extending cylinder in a restricted manner. When the first valve 134 is in the closed position, fluid is prevented from flowing between the retracting cylinder and the extending cylinder. The first valve 134 can be an infinite position valve. The line between the piston side 124 of the first cylinder 122 and the piston side 130 of the second cylinder 128 can include a flow control valve or flow restrictor 150. Any of the flow restrictors discussed herein can be fixed or variable.

The flow control position of the first valve 134 enables fluid flow between the piston side 124 of the first cylinder 122 and the piston side 130 of the second cylinder 128. The flow control position for any of the valves can be fixed or variable. The flow control position of the first valve 134 also enables fluid flow from the accumulator 140 to the piston side 130 of the second cylinder 128 and from the accumulator 142 to the piston side 124 of the first cylinder 122. As a result, when the first valve 134 is in the flow control position, the accumulators 140, 142 are fluidly connected to the piston sides 124, 130 of the first and second cylinders 122, 128.

The closed position of the first valve 134 prevents fluid flow between the piston side 124 of the first cylinder 122 and the piston side 130 of the second cylinder 128. The closed position of the first valve 134 also prevents fluid flow from the accumulator 140 to the piston side 130 of the second cylinder 128 and from the accumulator 142 to the piston side 124 of the first cylinder 122. As a result, when the first valve 134 is in the closed position, the accumulator 140 is fluidly connected to the piston side 124 of the first cylinder 122 and the accumulator 142 is fluidly connected to the piston side 130 of the second cylinder 128. During a roll condition, one of the first and second cylinders 122, 128 extends and the other one of the first and second cylinders 122, 128 retracts. When partially or fully open, the first valve 134 allows the excess fluid from the retracting cylinder to flow to the extending cylinder. When closed, the first valve 134 prevents the fluid from the retracting cylinder flowing to the extending cylinder, which increases the roll resistance by preventing fluid flow between the piston side 124 of the first cylinder 122 and the piston side 130 of the second cylinder 128.

The suspension system 120 can include an accumulator 144 fluidly connected to the piston side 124 of the first cylinder 122 via a second valve 136. The suspension system 120 can include an accumulator 146 fluidly connected to the piston side 130 of the second cylinder 128 via a third valve 138. Alternatively, the suspension system 120 can include an accumulator 144 fluidly connected to the piston side 124 of the first cylinder 122 via a second valve 136 and the piston side 130 of the second cylinder 128 via a third valve 138.

The second valve 136 can control fluid flow between the accumulator 144 and the piston side 124 of the first cylinder 122. The second valve 136 can selectively enable or prevent fluid flow between the accumulator 144 and the piston side 124 of the first cylinder 122. The second valve 136 can be an adjustable or variable two-position valve with an open or flow control position and a closed position. The second valve 136 can have an open position, an intermediate position, and a closed position. The intermediate position can include a plurality of partially open and partially closed positions between the open and the closed positions. When the second valve 136 is in the open or flow control position, fluid can flow from the accumulator 144 to the piston side 124 of the first cylinder 122. When the second valve 136 is in the intermediate position, fluid can flow from the accumulator 144 to the piston side 124 of the first cylinder 122 in a restricted manner. When the second valve 136 is in the closed position, fluid is prevented from flowing between the accumulator 144 to the piston side 124 of the first cylinder 122. The second valve 136 can be an infinite position valve. The stiffness of the suspension system 120 can be adjusted by opening or closing the second valve 136. The stiffness can be increased by closing the second valve 136 and the stiffness can be decreased by opening the second valve 136. The suspension system 120 can include one or more additional accumulators fluidly connected to the piston side 124 of the first cylinder 122 via one or more additional valves.

The third valve 138 can control fluid flow between the accumulator 146 and the piston side 130 of the second cylinder 128. The third valve 138 can selectively enable or prevent fluid flow between the accumulator 146 and the piston side 130 of the second cylinder 128. The third valve 138 can be an adjustable or variable two-position valve with an open or flow control position and a closed position. The third valve 138 can have an open position, an intermediate position, and a closed position. The intermediate position can include a plurality of partially open or closed positions between the open and the closed positions. When the third valve 138 is in the open or flow control position, fluid can flow from the accumulator 146 to the piston side 130 of the second cylinder 128. When the second valve 136 is in the intermediate position, fluid can flow from the accumulator 146 to the piston side 130 of the second cylinder 128 in a restricted manner. When the second valve 136 is in the closed position, fluid is prevented from flowing between the accumulator 146 and the piston side 130 of the second cylinder 128. The third valve 138 can be an infinite position valve. The stiffness of the suspension system 120 can be adjusted by opening or closing the third valve 138. The stiffness can be increased by closing the third valve 138 and the stiffness can be decreased by opening the third valve 138. The suspension system 120 can include one or more additional accumulators fluidly connected to the piston side 130 of the second cylinder 128 via one or more additional valves. When the cylinders 122, 128 are double acting, the suspension system 120 can include an accumulator 148 fluidly connected to the rod side 126 of the first cylinder 122 and the rod side 132 of the second cylinder 128. The line between the accumulator 148 and the rod side 126 of the first cylinder 122 can include a flow restrictor 152. The pressure circuit 196 can be fluidly connected to the accumulator 148, the rod side 126 of the first cylinder 122, and the rod side 132 of the second cylinder 128. In some implementations when the cylinders 122, 128 are single acting, the suspension system 120 the pressure circuit 196, the accumulator 148, and the flow restrictor 152 are not included.

With reference to FIGS. 1-4, the suspension system 120 includes an electronic control unit 180, or controller, having one or more microprocessor-based electronic control units or controllers, which perform calculations and comparisons and execute instructions. The controller 180 includes a processor, a core, volatile and non-volatile memory, digital and analog inputs, and digital and analog outputs. The controller 180 can include non-transitory, computer readable memory, such as random-access memory (RAM), read only memory (ROM), or electrically erasable programmable read only memory (EEPROM), which include instructions for execution by the processor. The controller 180 connects to and communicates with various input and output devices including, but not limited to, switches, relays, solenoids, actuators, light emitting diodes (LED's), passive and interactive displays, radio frequency devices (RFD's), sensors, and other controllers. The controller 180 receives communications or signals, via electrically or any suitable electromagnetic communication, from one or more devices, determines an appropriate response or action, and sends communications or signals to one or more devices. The controller 180 can be a microprocessor, an application specific integrated circuit (ASIC), a digital processor, or a programmable logic controller, also known as a PLC or programmable controller. The controller 180 can connect to and communicate with the tractor 100 electronic control system through a data bus, such as a CAN bus, or the controller 180 can be a part of the tractor 100 electronic control system.

The suspension system 120 can include a variety of sensors to detect or measure speed, direction, position, location, steering condition, pitch, roll, and yaw, and other properties of the tractor 100 including, but not limited to any type of sensor 182 capable of measuring pitch, roll, and yaw of the tractor 100 and any type of sensor 184 capable of measuring pitch, roll, and yaw of the cab 102. The controller 180 can determine the pitch, roll, and yaw of the tractor 100, the cab 102, and the slope of the terrain from the orientation or relative position sensors 182, 184. The suspension system 120 can include a steering sensor 186 which detects or measures the steering condition of the tractor 100. The suspension system 120 can include a speed sensor 188 which detects or measures the speed of the tractor 100. The suspension system 120 can include a plurality of pressure sensors 143, 145, 147, 149. Pressure sensor 143 can detect or measure the pressure in the line between the piston side 124 of the first hydraulic cylinder 122 and the piston side 130 of the second cylinder 128. Pressure sensor 145 can detect or measure the pressure in the line connected to the accumulator 144. Pressure sensor 147 can detect or measure the pressure in the line connected to the accumulator 146. Pressure sensor 149 can detect or measure the pressure in the line connected to the accumulator 148. The suspension system 120 can include a position sensor 123 to detect or measure the extension or retraction position of the first cylinder 122 and a position sensor 129 to detect or measure the extension or retraction position of the second cylinder 128. The controller 180 can connect to and communicate with the sensors 123, 129, 143, 145, 147, 149, 182, 184, 186, 188 and the valves 134, 136, 138, 154, 156, 158, 160, 162.

During operation of the tractor 100, the first and second cylinders 122, 128 can extend and retract as the frame 110 or cab 102 rolls left and right about the y-axis. When the frame 110 rolls left, the first cylinder 122 can retract, the second cylinder 128 can extend, or both. When the frame 110 rolls right, the first cylinder 122 can extend, the second cylinder 128 can retract, or both. When the first, second, and third valves 134, 136, 138 are at least partially open, fluid moves between the piston sides 124, 130 of the first and second cylinders 122, 128 and the accumulators 144, 146, 148 as the first and second cylinders 122, 128 extend and retract. Any of the first, second, and third valves 134, 136, 138 can be open or closed or in any position in between. When all three valves 134, 136, 138 are fully open, the first and second cylinders 122, 128 extend and retract with a lower amount of resistance resulting in the suspension system 120 having a lower roll resistance. When all three valves 134, 136, 138 are fully closed, the first and second cylinders 122, 128 extend and retract with a higher amount of resistance resulting in the suspension system 120 having a higher roll resistance. In some implementations, partially or fully closing the first valve 134 increases the roll resistance more than partially or closing the second valve 136 or the third valve 138.

According to some implementations, the controller 180 can determine the roll condition of the suspension system 120, tractor 100, or both based upon one or more of the speed, pitch, roll, and steering condition via one or more of the speed sensor 188, positioning sensor 182, positioning sensor 184, and steering sensor 186. In other implementations, the controller 180 can determine the roll conditions of the suspension system 120, tractor 100, or both based upon the pressures sensed by the one or more of the pressure sensors 143, 145, 147, 149. In other implementations, the controller 180 can determine the roll condition of the suspension system 120, tractor 100, or both based upon the orientation or relative position measured by the one or more relative position sensors 182, 184.

Figure 5:
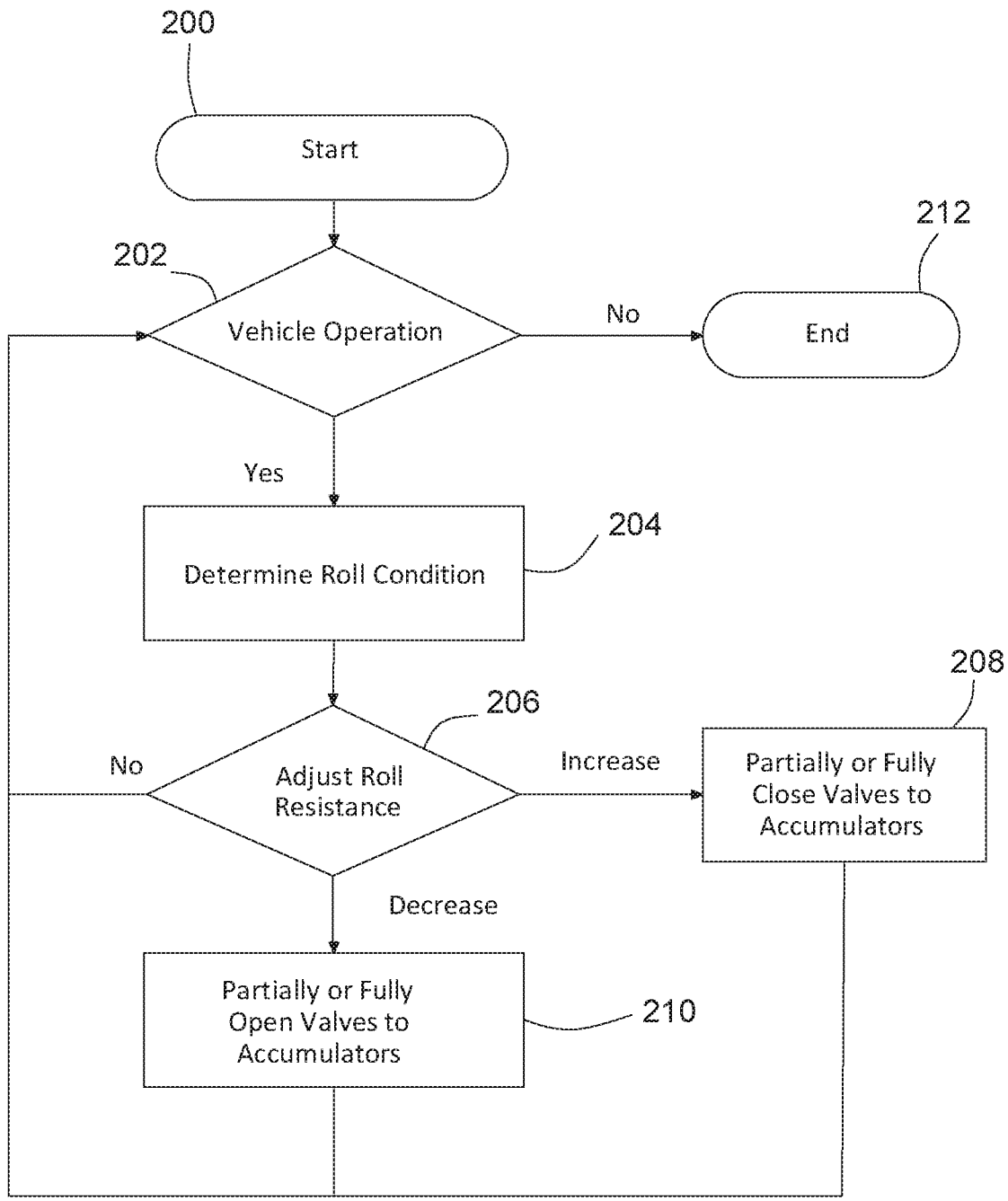
FIG. 5 is a flow diagram for a method of operating a suspension system for a work vehicle, according to an implementation.

FIG. 5 illustrates a method of varying the roll resistance of a suspension system 120, which may be implemented in one or more of the implementations described herein and depicted in the various FIGURES. At step 200, the method starts.

At step 202, the controller 180 determines whether the tractor 100 is in operation. If the tractor 100 is operating, then the method continues to step 204. Otherwise the method continues to step 212.

At step 204, the roll condition of the suspension system 120 is determined by the controller 180 in communication with one or more sensors. In one implementation, the controller 180 can determine the roll condition of the frame 110, cab 102, or both based in part on one or more of the pressure sensors 143, 145, 147, 149. In another implementation, the controller 180 can determine the roll conditions of the frame 110, cab 102, or both based in part on one or more position sensors 123, 129, which detect or measure the extension or retraction position of the first and second cylinders 122, 128. In another implementation, the controller 180 can determine the roll condition of the frame 110, cab 102, or both based in part on one or more of the relative position sensors 182, 184, which detect or measure the relative position of the frame 110, cab 102, or both. In another implementation, the controller 180 can determine the roll condition of the frame 110, cab 102, or both based in part on the speed, pitch, roll, and steering condition of the tractor 100 via one or more of the speed sensor 188, relative position sensor 182, relative position sensor 184, and steering sensor 186. The controller 180 can determine the pitch, roll, and yaw of the tractor 100 in relation to or independent of the slope of the terrain via one or more of the relative position sensors 182, 184. The method continues with step 206.

At step 206, the controller 180 determines whether the roll condition of the suspension system 120 needs to be adjusted by either increasing or decreasing the roll resistance. The controller 180 can determine whether the roll condition of the suspension system 120 is within or outside a first set of values and a second set of values. If the roll condition of the suspension system 120 is outside both the first set of values and the second set of values, then the method returns to step 202. If the roll condition of the suspension system 120 is within the first set of values, then the controller 180 determines to increase the roll resistance and the method continues to step 208. If the roll condition of the suspension system 120 is within the second set of values, then the controller 180 determines to decrease the roll resistance and the method continues to step 210. In one implementation, the controller 180 can determine whether the detected or measured pressures of the one or more pressure sensors 143, 145, 147, 149 are within the first or second set of values. In another implementation, the controller 180 can determine whether the detected or measured extension or retraction position of the first and second cylinders 122, 128 via the position sensors 123, 129 are within the first or second set of values. Additionally, or alternatively, the controller 180 can determine whether the rate of change of the detected or measured pressures or positions are within the first or second set of values.

In another implementation, the controller 180 determines whether the orientation or relative position of the frame 110, cab 102, or both are within the first or second set of values. Additionally, or alternatively, the controller 180 can determine whether the rate of change of the orientation or relative position of the frame 110, cab 102, or both are within the first or second set of values.

In one implementation, if one or more of the positions, pressures, or rate of change are within the first set of values, then the controller 180 determines to increase the roll resistance and the method continues to step 208. If one or more of the positions, pressures, or rate of change are within the second set of values, then the controller 180 determines to decrease the roll resistance and the method continues with step 210. In another implementation, if the relative position, or rate of change, or both are within the first set of values, then the controller 180 determines to increase the roll resistance and the method continues to step 208. If the orientation, or rate of change, or both are within the second set of values, then the controller 180 determines to decrease the roll resistance and the method continues with step 210.

At step 208, the controller 180 increases the roll resistance by at least partially or fully closing one or more valves 134, 136, 138 in the lines connected to the first and second cylinders 122, 128. When the first valve 134 is at least partially closed, the fluid flow between the first and second cylinders 122, 128 is restricted, which limits the fluid flow between the first and second cylinders 122, 128. When the first valve 134 is fully closed, the fluid flow between the first and second cylinders 122, 128 is blocked, which prevents fluid flow between the first and second cylinders 122, 128. When second valve 136 is at least partially closed, the fluid flow between the accumulator 144 and the first cylinder 122 is restricted, which limits the fluid flow between the first cylinder 122 and the accumulator 144. When second valve 136 is fully closed, the fluid flow between the accumulator 144 and the first cylinder 122 is blocked, which prevents fluid flow between the first cylinder 122 and the accumulator 144. When third valve 138 is at least partially closed, the fluid flow between the accumulator 146 and the second cylinder 128 is restricted, which limits the fluid flow between the second cylinder 128 and the accumulator 146. When third valve 138 is fully closed, the fluid flow between the accumulator 146 and the second cylinder 128 is blocked, which prevents fluid flow between the second cylinder 128 and the accumulator 146. The more closed the valves 134, 136, 138 are, the higher the resistance in the first and second cylinders 122, 128, which results in a higher roll resistance in the suspension system 120. When the adjustment of the roll resistance is complete, the method continues with step 202.

At step 210, the controller 180 decreases the roll resistance by at least partially or fully opening one or more valves 134, 136, 138 in the lines connected to the first and second cylinders 122, 128. When the first valve 134 is at least partially or fully open, the flow between the first and second cylinders 122, 128 is permitted, which allows the first and second cylinders 122, 128 to provide and receive fluid from each other. When second valve 136 is at least partially or fully open, the flow between the accumulator 144 and the first cylinder 122 is permitted, which allows the first cylinder 122 and the accumulator 144 to provide and receive fluid from each other. When third valve 138 is at least partially or fully opened, the flow between the accumulator 146 and the second cylinder 128 is permitted, which allows the second cylinder 128 and the accumulator 146 to provide and receive fluid from each other. The more open the valves 134, 136, 138 are, the lower the resistance in the first and second cylinders 122, 128, which results in a lower roll resistance in the suspension system 120. When the adjustment of the roll resistance is complete, the method continues with step 202.

At step 212, the method of varying the roll resistance of a suspension system 120 is complete, according to one implementation. In other implementations, one or more of these steps, processes, or operations may be omitted, repeated, re-ordered, combined, or separated and still achieve the desired results.

Without in any way limiting the scope, interpretation, or application of the claims appearing below, a technical effect of one or more of the example implementations or implementations disclosed herein is a suspension system for a work vehicle which has a variable or adjustable roll resistance. The left and right sides of the suspension system can be varied individually or together. The roll resistance of the suspension system can be varied to maintain the operator station within specified or prescribed roll limits. The roll resistance of the suspension system can be adjusted to respond to or anticipate changes in the terrain.

The terminology used herein is for describing particular implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

One or more of the steps or operations in any of the methods, processes, or systems discussed herein may be omitted, repeated, re-ordered, combined, or separated and are within the scope of the present disclosure.

While the above describes example implementations of the present disclosure, these descriptions should not be viewed in a restrictive or limiting sense. Rather, there are several variations and modifications which may be made without departing from the scope of the appended claims.

What is claimed is:

1. A suspension system for a work vehicle comprising:
    a first cylinder having a piston side;
    a second cylinder having a piston side, the first and second cylinders extending and retracting during a roll condition of the suspension system;
    a first valve selectively enabling and restricting fluid flow between the piston side of the first cylinder and the piston side of the second cylinder to adjust a roll resistance of the suspension system;
    a first accumulator fluidly connected to the piston side of the first cylinder; and
    a second valve selectively enabling and restricting fluid flow between the first accumulator and the piston side of the first cylinder to adjust the roll resistance of the suspension system, the second valve including an open position enabling fluid flow between the first accumulator and the piston side of the first cylinder, an intermediate position restricting fluid flow between the first accumulator and the piston side of the first cylinder, and a closed position preventing fluid flow between the first accumulator and the piston side of the first cylinder.

2. The suspension system of claim 1, further comprising:
    a second accumulator fluidly connected to the piston side of the second cylinder; and
    a third valve selectively enabling and restricting fluid flow between the second accumulator and the piston side of the second cylinder to adjust the roll resistance of the suspension system.

3. The suspension system of claim 2, further comprising:
    a third accumulator fluidly connected to the piston side of the first cylinder, the third accumulator bypassing the second valve; and
    a fourth accumulator fluidly connected to the piston side of the second cylinder, the fourth accumulator bypassing the third valve.

4. The suspension system of claim 2, wherein the third valve comprises an open position enabling fluid flow between the second accumulator and the piston side of the second cylinder, an intermediate position restricting fluid flow between the second accumulator and the piston side of the second cylinder, and a closed position preventing fluid flow between the second accumulator and the piston side of the second cylinder.

5. The suspension system of claim 2, wherein the roll resistance of the suspension system is increased by at least partially closing one of the first valve, the second valve, and the third valve.

6. The suspension system of claim 1, further comprising:
    a second accumulator fluidly connected to a rod side of the first cylinder and a rod side of the second cylinder.

7. The suspension system of claim 1, wherein the first valve comprises an open position enabling fluid flow between the piston side of the first cylinder and the piston side of the second cylinder, an intermediate position restricting fluid flow between the piston side of the first cylinder and the piston side of the second cylinder, and a closed position preventing fluid flow between the piston side of the first cylinder and the piston side of the second cylinder.

8. The suspension system of claim 1, wherein the roll resistance of the suspension system is increased by at least partially closing the first valve.

9. A work vehicle having a variable suspension system comprising:
a plurality of ground engaging apparatus;
an operator station;
a left-side cylinder having a piston side and a right-side cylinder having a piston side, the left-side and right-side cylinders positioned between the operator station and the ground engaging apparatus, and the left-side and right-side cylinders extending and retracting during a roll condition of the suspension system;
a first valve selectively enabling and restricting fluid flow between the piston side of the left-side cylinder and the piston side of the right-side cylinder to adjust a roll resistance of the suspension system, the first valve including an open position enabling fluid flow between the piston side of the left-side cylinder and the piston side of the right-side cylinder, an intermediate position restricting fluid flow between the piston side of the left-side cylinder and the piston side of the right-side cylinder, and a closed position preventing fluid flow between the piston side of the left-side cylinder and the piston side of the right-side cylinder;
a first accumulator fluidly connected to the piston side of the left-side cylinder; and
a second valve selectively enabling and restricting fluid flow between the first accumulator and the piston side of the left-side cylinder to adjust the roll resistance of the suspension system, the second valve including an open position enabling fluid flow between the first accumulator and the piston side of the left-side cylinder, an intermediate position restricting fluid flow between the first accumulator and the piston side of the left-side cylinder, and a closed position preventing fluid flow between the first accumulator and the piston side of the left-side cylinder.

10. The work vehicle of claim 9, further comprising:
a second accumulator fluidly connected to the piston side of the right-side cylinder;
a third valve selectively enabling and restricting fluid flow between the second accumulator and the piston side of the right-side cylinder to adjust a roll resistance of the suspension system, the third valve including an open position enabling fluid flow between the second accumulator and the piston side of the right-side cylinder, an intermediate position restricting fluid flow between the second accumulator and the piston side of the right-side cylinder, and a closed position preventing fluid flow between the second accumulator and the piston side of the right-side cylinder.

11. The work vehicle of claim 10, further comprising:
a third accumulator fluidly connected to the piston side of the first cylinder, the third accumulator bypassing the second valve; and
a fourth accumulator fluidly connected to the piston side of the second cylinder, the fourth accumulator bypassing the third valve.

12. The work vehicle of claim 10, wherein the roll resistance of the suspension system is increased by at least partially closing the first valve; and wherein the roll resistance of the suspension system is further increased by at least partially closing at least one of the second valve and the third valve.

13. The work vehicle of claim 9, further comprising:
a second accumulator fluidly connected to a rod side of the first cylinder and a rod side of the second cylinder.

14. A method of varying the roll resistance of a suspension system for a work vehicle comprising:
determining a roll condition of the suspension system;
determining whether to adjust a roll resistance of the suspension system based upon the roll condition of the suspension system;
increasing the roll resistance of the suspension system when the roll condition is within a first set of values by at least partially closing a first valve, the first valve controlling fluid flow between a first cylinder and a second cylinder;
decreasing the roll resistance of the suspension system when the roll condition is within a second set of values by at least partially opening the first valve;
further increasing the roll resistance of the suspension system when the roll condition is within the first set of values by at least partially closing a second valve, the second valve controlling the flow between the first cylinder and a first accumulator, the second valve including an open position enabling fluid flow between the first accumulator and the piston side of the first cylinder, an intermediate position restricting fluid flow between the first accumulator and the piston side of the first cylinder, and a closed position preventing fluid flow between the first accumulator and the piston side of the first cylinder; and
further decreasing the roll resistance of the suspension system when the roll condition is within a second set of values by at least partially opening the second valve.

15. The method of claim 14, further comprising:
further increasing the roll resistance of the suspension system when the roll condition is within a first set of values by at least partially closing a third valve, the third valve controlling the flow between the second cylinder and a second accumulator, the third valve including an open position enabling fluid flow between the second accumulator and the piston side of the second cylinder, an intermediate position restricting fluid flow between the second accumulator and the piston side of the second cylinder, and a closed position preventing fluid flow between the second accumulator and the piston side of the second cylinder; and
further decreasing the roll resistance of the suspension system when the roll condition is within the second set of values by opening the third valve.

16. The method of claim 15, further comprising:
further increasing the roll resistance of the suspension system when the roll condition is within the first set of values by closing the first valve, the second valve, and the third valve; and
further decreasing the roll resistance of the suspension system when the roll condition is within the second set of values by opening the first valve, the second valve, and the third valve.

17. The method of claim 15, further comprising:
fluidly connecting a third accumulator to the piston side of the first cylinder, the third accumulator bypassing the second valve; and
fluidly connecting a fourth accumulator to the piston side of the second cylinder, the fourth accumulator bypassing the third valve.

18. The method of claim 14, further comprising:
fluidly connecting a second accumulator to a rod side of the first cylinder and a rod side of the second cylinder.

19. A suspension system for a work vehicle comprising:
a first cylinder having a piston side;
a second cylinder having a piston side, the first and second cylinders extending and retracting during a roll condition of the suspension system;
a first valve selectively enabling and restricting fluid flow between the piston side of the first cylinder and the piston side of the second cylinder to adjust a roll resistance of the suspension system;
a first accumulator fluidly connected to the piston side of the first cylinder;
a second valve selectively enabling and restricting fluid flow between the first accumulator and the piston side of the first cylinder to adjust the roll resistance of the suspension system;
a second accumulator fluidly connected to the piston side of the second cylinder;
a third valve selectively enabling and restricting fluid flow between the second accumulator and the piston side of the second cylinder to adjust the roll resistance of the suspension system;
a third accumulator fluidly connected to the piston side of the first cylinder, the third accumulator bypassing the second valve;
a fourth accumulator fluidly connected to the piston side of the second cylinder, the fourth accumulator bypassing the third valve; and
a fifth accumulator fluidly connected to a rod side of the first cylinder and a rod side of the second cylinder.

* * * * *